April 21, 1953 F. O. TEMPLE 2,636,107
ELECTRICAL HIGH-FREQUENCY HEATING APPARATUS
Filed July 28, 1949

FRANKLIN O. TEMPLE INVENTOR.

BY R. W. Hodgson

Patented Apr. 21, 1953

2,636,107

UNITED STATES PATENT OFFICE 2,636,107

ELECTRICAL HIGH-FREQUENCY HEATING APPARATUS

Franklin O. Temple, Glendale, Calif.

Application July 28, 1949, Serial No. 107,169

2 Claims. (Cl. 219—47)

This invention relates generally to high frequency heating apparatus and more particularly to high frequency heating apparatus wherein a rapidly alternating electric field is applied across a load for heating said load. In such systems, the load, which may comprise a single or a plurality of separate bodies of material which is to be heated, is usually composed of a material which is a relatively poor conductor of electricity of the type commonly known in the art as a dielectric material, is placed in a high frequency alternating electric field between two opposed electrodes effectively connected to a suitable electric oscillation generator. Frequently in such systems one of said opposed electrodes, usually the lower electrode, acts as a platen, supporting and usually being in electrical contact with the load which is to be heated. Frequently in such systems the other of said opposed electrodes, usually the upper electrode is separated by an air gap from the load supported by the first mentioned electrode. This is usually so, in order that the voltage across the load to be heated and/or the electric power delivered to the load may be adjusted by adjusting said electrode and varying said air gap which has the effect of varying the effective capacity between the two opposed electrodes between which the load is positioned. By thus varying the capacity between the opposed electrodes by adjusting the gap therebetween, the capacitive reactance and impedance of the condenser effectively formed by the two opposed electrodes, the air gap and the load positioned therebetween is also varied. This variation of capacitive reactance and/or impedance, causes a variation of the effective voltage applied across the load to be heated which correspondingly varies the resistive component of the electric current flowing through the load and therefore varies the power delivered to the load and the heating thereof. Through the use of such an adjustable gap opposed electrode system it is possible, with various different types of loads of different physical size and/or different electrical characteristics to adjust the gap until the electric oscillation generator which is effectively connected to the electrodes is operating at a selected, optimum electric power output level.

However, such prior art high frequency heating systems have one major disadvantage which has given rise to the present invention which completely avoids said major disadvantage. This prior art disadvantage arises from the fact that all of the material positioned between the opposed energizing electrodes is not the same. In other words the dielectric between the electrodes, including both the air and the load, is non-homogeneous since it includes both the material of which the load is composed and the air between the opposed electrodes which usually have different dielectric constants. This causes a distortion or warping of the electric field between the opposed electrodes in a manner such that uneven heating of the load frequently occurs. In such cases, certain portions of the load where the potential gradient is considerably higher than elsewhere will become much hotter than the rest of the load in a given period of time. This is exceedingly undesirable since it makes it difficult to use such a high frequency system commercially on a production scale in a manufacturing or chemical plant such as, for example, in the heating of, what are known in the art as plastic preforms immediately prior to a pressurized forming operation wherein the preforms are molded, or otherwise formed into a desired article such as an electric iron handle, for example, since certain ones of a group of plastic preforms simultaneously heated between the opposed energizing electrodes will become too hot during the heating cycle, and certain other plastic preforms will not become hot enough during the heating cycle. Or different portions of the same plastic preform may be heated to different temperatures during the heating cycle. The above leads to a high number of rejects and generally unsatisfactory results because of a lack of consistency and standardization in the heated plastic preforms.

I have found that the above mentioned disadvantages of prior art systems can be avoided by arranging the opposed energizing electrodes in a manner whereby they can be placed in contact with opposed surfaces of the load (which may comprise a plurality of separate bodies of material such as plastic preforms, for example). Since each of the opposed electrodes may be considered to present a virtually equipotential surface (modified, of course, by any potential variation caused by standing waves which can be minimized by minimizing the ratio of the electrode size to the wave length of the energizing electric oscillations applied thereto), and since said opposed electrodes are in contact with opposite surfaces of the load, very little distortion of the electric field through the load occurs; thus various portions of the load, whether integral or separated, are heated at virtually the same rate and will be raised to virtually the same temperature during the heating cycle.

In order to vary the voltage across the load for adjusting the power delivered to the load in my system where the opposed electrodes are placed in contact with opposite surfaces of the load, I have found it desirable to effectively connect an adjustable capacitor means between at least one of the energizing electrodes and the electric oscillation generator effectively connected thereto. Preferably this capacitor means includes one of said energizing electrodes as a part thereof with said energizing electrode acting as one plate of the capacitor thus providing a relatively simple, cheap, foolproof, adjustable system capable of heating various portions of a load whether integral or separate, at a virtually uniform rate.

Generally speaking, the present invention comprises apparatus in accordance with the above principles and includes means for placing the opposed electrodes in contact with different surfaces of the load and in the preferred form includes adjustable capacitor means arranged to vary the voltage between the opposed energizing electrodes preferably in a form whereby one of said energizing electrodes forms part of said adjustable capacitor means and is only capacitively coupled to the other part of the adjustable capacitor means which is effectively, electrically connected to one output terminal of an electric oscillation generator, the other output terminal of which is effectively, electrically connected to the other energizing electrode.

It should be noted that wherever I use the expression "effectively electrically connected" or variations thereof, it shall be understood that it is not to be interpreted in a limiting sense but shall include direct electrical connection and/or coupling (of any type) and any other arrangement where energy is transferred from one circuit element or circuit to another circuit element or circuit.

With the above points in mind it is an object of the present invention to provide improved apparatus adapted for energization by a high frequency electric oscillation generator, arranged to subject a load to a relatively undistorted high frequency alternating electric field of adjustable intensity for heating the load at a selected virtually uniform rate throughout various different portions of the load whether said portions are integral or separated.

It is a further object of the present invention to provide improved apparatus adapted to be energized by a high frequency electric oscillation generator, including opposed energizing electrodes arranged to make contact with opposite surfaces of a load whereby to subject said load to a relatively undistorted, high frequency, alternating electric field for heating different portions of the load whether integral or separated at a uniform rate, and also including adjustable capacitor means cooperating with the energizing electrode means and adapted for selective operation to vary the potential between the opposed energizing electrodes for varying the power input to the load.

Other and allied objects will be apparent to those skilled in the art from a careful perusal, examination, and study of the illustrations, specification and appended claims.

To facilitate understanding reference will be made to the hereinbelow described drawings.

Figure 1:
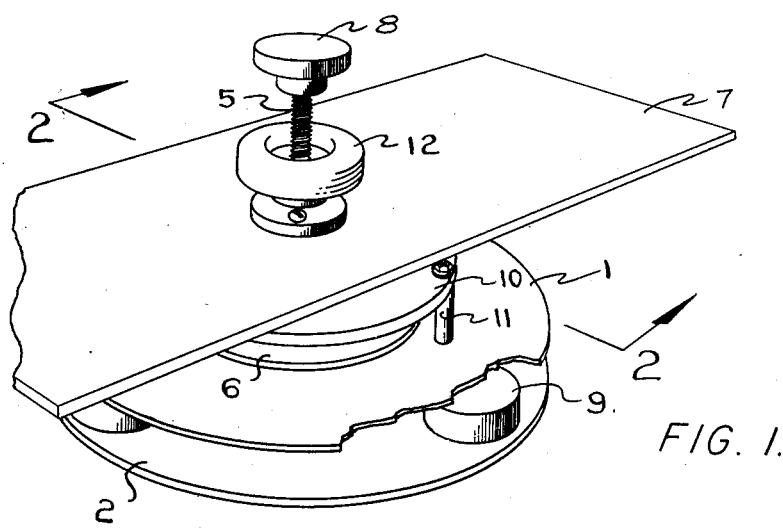
Fig. 1 is a perspective view of one illustrative embodiment of the present invention.
Figure 2:
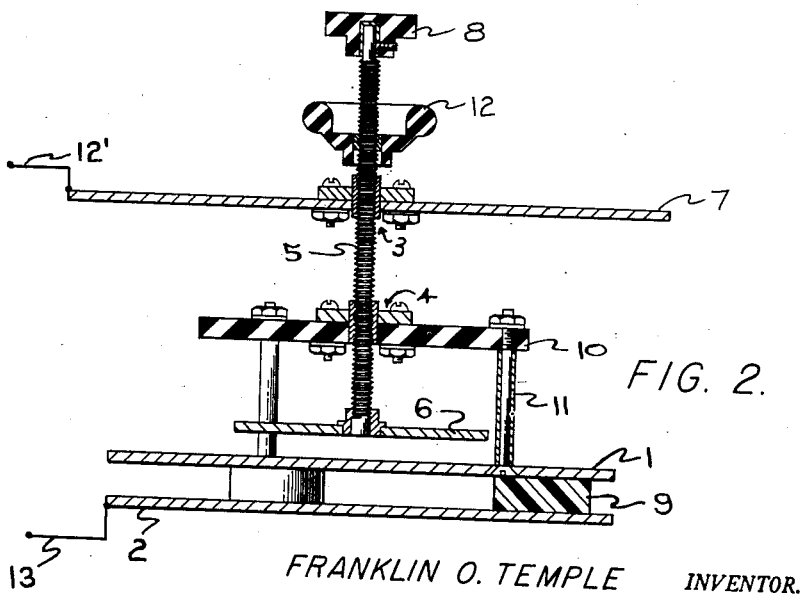
Fig. 2 is a vertical sectional view of the embodiment of the invention shown in Fig. 1 taken in the direction of arrows 2—2.

More specifically opposed energizing electrode means are provided and are arranged to make contact with opposite surfaces of a load which may comprise a single body of material to be heated or a plurality of separate bodies of material which are to be heated. Since the spaced opposed energizing electrodes indicated at 1 and 2 are arranged to make contact with the load, they will be frequently referred to herein as platen means which is to be understood to mean either or both of electrodes 1 and 2. In the example illustrated, the upper contact electrode, or platen means, 1 is adjustably positioned with respect to the lower contact electrode, or platen means, 2 whereby said upper and lower platen means may be adjusted so as to make contact with opposite surfaces of loads of different thicknesses. In the specific example illustrated, this is accomplished by adjusting means comprising what I have called capacitor plate carrying, adjusting means and platen carrying, adjusting means indicated respectively at 3 and 4. In the specific example illustrated, the capacitor plate carrying, adjusting means 3 comprises a longitudinal, exteriorly threaded shaft 5 carrying an adjustable disc-shaped capacitor plate 6 at its lower end and being adjustably threadably engaged with respect to a portion of a housing 7 (which is shown broken away). In the example illustrated, the upper end of the shaft 5 is provided with a suitable handle 8 adapted for manual rotation whereby the threaded shaft 5 may be rotated with respect to the housing 7 with respect to which the shaft 5 is threadedly engaged, thus raising or lowering the adjustable condenser plate 6 with respect to the housing 7 and with respect to the lower contact electrode or platen means 2 upon which a load such as is indicated at 9 is adapted to rest. In the specific example illustrated, the platen carrying, adjusting means 4 comprises a non-electrically conductive, disc-shaped member 10 which is adjustably threadedly engaged on the longitudinal shaft 5, and which is provided with downwardly extending supports 11 carrying the upper contact electrode or platen means 1 in a position spaced above and virtually parallel to the lower contact electrode or platen means 2. It can be seen from an examination of the figures, that relative rotation of the vertical threaded shaft 5 with respect to the insulating disc 10, relatively raises or lowers the position of the upper contact electrode or platen means 1 with respect to the adjustable capacitor plate 6, thus effectively changing the capacity across the condenser comprising the adjustable capacitor plate 6 and the upper contact electrode or platen means 1. From the above description and a careful examination of the figures, it will be readily understood that through the operation of the adjusting means 3 and/or 4, the spacing between the upper contact electrode or platen means 1 and the lower contact electrode or platen means 2 may be varied so as to be in contact with opposite surface of a load of any desired thickness, and the spacing between adjustable capacitor plate 6 and the upper contact electrode or platen means 1 can also be varied in order to provide the desired potential across the load. In the example specifically described and illustrated, suitable locking means is provided in the form of a knob 12 adjustably, threadedly engaged on the vertical shaft 5. The knob 12 may be rotated with respect to the shaft 5 and caused to frictionally engage the housing 7 or locking means carried thereby, thus frictionally locking the shaft 5 in a selected position with respect to the housing 7. In the specific example illustrated, the shaft 5 is electrically conductive, being preferably formed of a metallic material, and is electrically connected to the adjustable capacitor plate 6 at one end and is electrically connected to the housing 7 through the threaded engagement of the shaft 5 and the housing 7. Thus the housing 7 comprises one input terminal schematically indicated at 12', adapted to be effectively electrically connected to one output terminal of an electric oscillation generator (not shown). The lower contact electrode or platen means 2 comprises the other effective input terminal, schematically indicated at 13, which is adapted to be effectively electrically connected to the other output terminal of the electric oscillation generator (not shown). In the specific example illustrated, it should be noted that the non-electrically conductive disc 10 electrically insulates the upper contact electrode or platen means 1 from the capacitor plate 6 and the shaft 5, and that said upper contact electrode or platen means 1 is capacitively coupled by means of the condenser plate 6 and the shaft 5 to the input terminal diagrammatically indicated at 12'.

The operation of the illustrated embodiment of the present invention may be described as follows: A load either singular, or plural, is placed on lower platen 2 and the upper platen 1 is adjusted by the adjusting means until the upper platen means 1 is in contact with the upper surface of the load. The adjustable capacitor plate 6 is then adjusted until the voltage across the load, or the power delivered to the load reaches a selected value (this is usually determined by the D. C. plate current drawn by an electronic oscillation generator which is effectively electrically connected to the input terminals 12' and 13).

Numerous modifications and variations of the present invention are possible within the spirit and scope thereof, and all such are intended to be included and comprehended herein. For example, the adjustable capacitor illustrated as comprising the upper platen means and an adjustable capacitor plate positioned thereabove, might cooperate with the bottom platen means instead and may be modified within wide limits both as to position and structure, as may be the adjusting means. The electrode shape and arrangement may also be altered if desired and may form part of a press adapted to apply pressure to the load, if desired.

The examples described and illustrated herein are exemplary only and are not intended to limit the scope of the present invention which is to be interpreted in the light of the prior art and the appended claims with due consideration for the doctrine of equivalents.

I claim:

1. In electrical high frequency heating apparatus of the type wherein an electric field of rapidly alternating electrical polarity is applied across a load for heating said load, the provision of: opposed platen means arranged to make positive physical contact with different surfaces of a load positioned therebetween, said platen means having surface areas substantially larger than the surfaces of the load positioned therebetween, whereby a virtually uniform voltage gradient will exist across the entire load, said opposed platen means being adapted to be effectively, oppositely, electrically energized by a high frequency oscillation generator for creating a high frequency alternating electric field therebetween; manually adjustable capacitor means including capacitor plate means mechanically, manually adjustably connected to one of the platen means in adjustably spaced capacitive relationship with respect thereto and electrically insulated therefrom, said capacitor plate means being effectively electrically connected to one terminal of the electric oscillation generator, the other terminal of which is effectively electrically connected to the other platen means, whereby the effective voltage applied across, and the electrical power delivered to the load can be selectively adjusted by adjusting the space between the capacitor plate means and the platen means adjustably, spacedly, mechanically connected with respect thereto; capacitor plate carrying manually operable adjusting means positionably, manually adjustably, mechanically engaged with respect to a housing and carrying the capacitor plate means within the housing; platen carrying manually operable adjusting means positionably, mechanically, manually adjustably engaged with respect to the capacitor plate carrying adjusting means and carrying the movable platen means within the housing in an adjustably spaced position with respect to the capacitor plate means; the arrangement of the capacitor plate carrying adjusting means and the relatively adjustable platen carrying adjusting means being such that manual adjustment of both the effective capacity across the load and the actual distance between opposed platen means can be effected from the exterior of the housing by first manually adjusting the effective distance between opposed platens so that said opposed platens are in frictional engagement with opposite surfaces of a load and then manually adjusting the space between the capacitor plate means and the adjustably connected platen means; said capacitor plate carrying adjusting means comprising a longitudinal, electrically conductive member adapted to be manually adjustably, threadedly engaged and in electrical contact with an electrically conductive housing and in electrical contact with the capacitor plate carrying means; and said platen carrying adjusting means comprising non-electrically conductive means manually adjustably, threadedly engaged with respect to said longitudinal electrically conductive member and carrying the adjustable platen means spaced from, and virtually parallel to, said adjustable capacitor plate means.

2. Apparatus of the character defined in claim 1, including manually operable locking means threadedly engaged with respect to the longitudinal electrically conductive member and arranged to cooperate with the housing for selectively, frictionally locking said longitudinal member in a selected position with respect to the housing.

FRANKLIN O. TEMPLE.

References Cited in the file of this patent

UNITED STATES PATENTS

| Number | Name | Date |
|---|---|---|
| 2,436,732 | Rowe | Feb. 24, 1948 |
| 2,465,102 | Joy | Mar. 22, 1949 |
| 2,467,782 | Schuman | Apr. 19, 1949 |
| 2,504,956 | Atwood | Apr. 25, 1950 |
| 2,504,969 | Ellsworth | Apr. 25, 1950 |
| 2,514,101 | Stanley | July 4, 1950 |
| 2,522,487 | Warren | Sept. 12, 1950 |

FOREIGN PATENTS

| Number | Country | Date |
|---|---|---|
| 607,572 | Great Britain | Sept. 1, 1948 |

OTHER REFERENCES

Mittelmann, "Load Rematching," Electronics, February 1945, pages 110–115, particularly pages 114 and 115.